United States Patent
Lewis et al.

(10) Patent No.: US 10,031,877 B2
(45) Date of Patent: Jul. 24, 2018

(54) INCLUDING CONTROL DATA IN A SERIAL AUDIO STREAM

(71) Applicant: INVENSENSE, INC., San Jose, CA (US)

(72) Inventors: Jerad M. Lewis, Cambridge, MA (US); Kieran P. Harney, Andover, MA (US); Aleksey S. Khenkin, Nashua, NH (US)

(73) Assignee: INVENSENSE, INC., San Jose, CA (US)

( * ) Notice: Subject to any disclaimer, the term of this patent is extended or adjusted under 35 U.S.C. 154(b) by 293 days.

(21) Appl. No.: 14/622,439

(22) Filed: Feb. 13, 2015

(65) Prior Publication Data
US 2016/0239451 A1    Aug. 18, 2016

(51) Int. Cl.
*H05K 7/10* (2006.01)
*G06F 13/40* (2006.01)
*G06F 13/42* (2006.01)
*G06F 1/10* (2006.01)

(52) U.S. Cl.
CPC ............ *G06F 13/4068* (2013.01); *G06F 1/10* (2013.01); *G06F 13/4282* (2013.01)

(58) Field of Classification Search
CPC ..... G06F 13/4068; G06F 1/10; G06F 13/4282
USPC ....................................................... 710/301
See application file for complete search history.

(56) References Cited

U.S. PATENT DOCUMENTS

| | | | | |
|---|---|---|---|---|
| 8,179,161 | B1* | 5/2012 | Williams | H03K 19/01759 326/82 |
| 2004/0116151 | A1* | 6/2004 | Bosch | G06F 13/4291 455/550.1 |
| 2012/0272089 | A1* | 10/2012 | Hatfield | G06F 13/4291 713/501 |
| 2014/0105415 | A1* | 4/2014 | Jain | G08C 19/00 381/77 |

* cited by examiner

*Primary Examiner* — Chun Kuan Lee
(74) *Attorney, Agent, or Firm* — Amin, Turocy & Watson, LLP

(57) ABSTRACT

Including control data in a serial audio stream is presented herein. A device can include a clock component that is configured to send, via a clock pin of the device, a bit clock signal directed to a slave device. A frame component can send, via a frame pin of the device, a frame clock signal directed to the slave device. A control component can receive, via a data pin of the device during a first portion of a phase of a period of the frame clock signal, slave data from the slave device on a bit-by-bit basis based on the bit clock signal according to an integrated interchip sound ($I^2S$) based protocol; and send, via the data pin during a second portion of the phase after the first portion, a set of control bits directed to the slave device on the bit-by-bit basis based on the bit clock signal.

24 Claims, 14 Drawing Sheets

INCLUDING CONTROL DATA IN A SERIAL AUDIO STREAM

TECHNICAL FIELD

The subject disclosure generally relates to embodiments for including control data in a serial audio stream.

BACKGROUND

Conventional serial audio stream technologies utilize a unidirectional signal line to transfer audio data from a microphone to a controlling device. In this regard, conventional serial audio stream technologies have had some drawbacks, some of which may be noted with reference to the various embodiments described herein below.

BRIEF DESCRIPTION OF THE DRAWINGS

Non-limiting embodiments of the subject disclosure are described with reference to the following figures, wherein like reference numerals refer to like parts throughout the various views unless otherwise specified.

DETAILED DESCRIPTION

Figure 1:
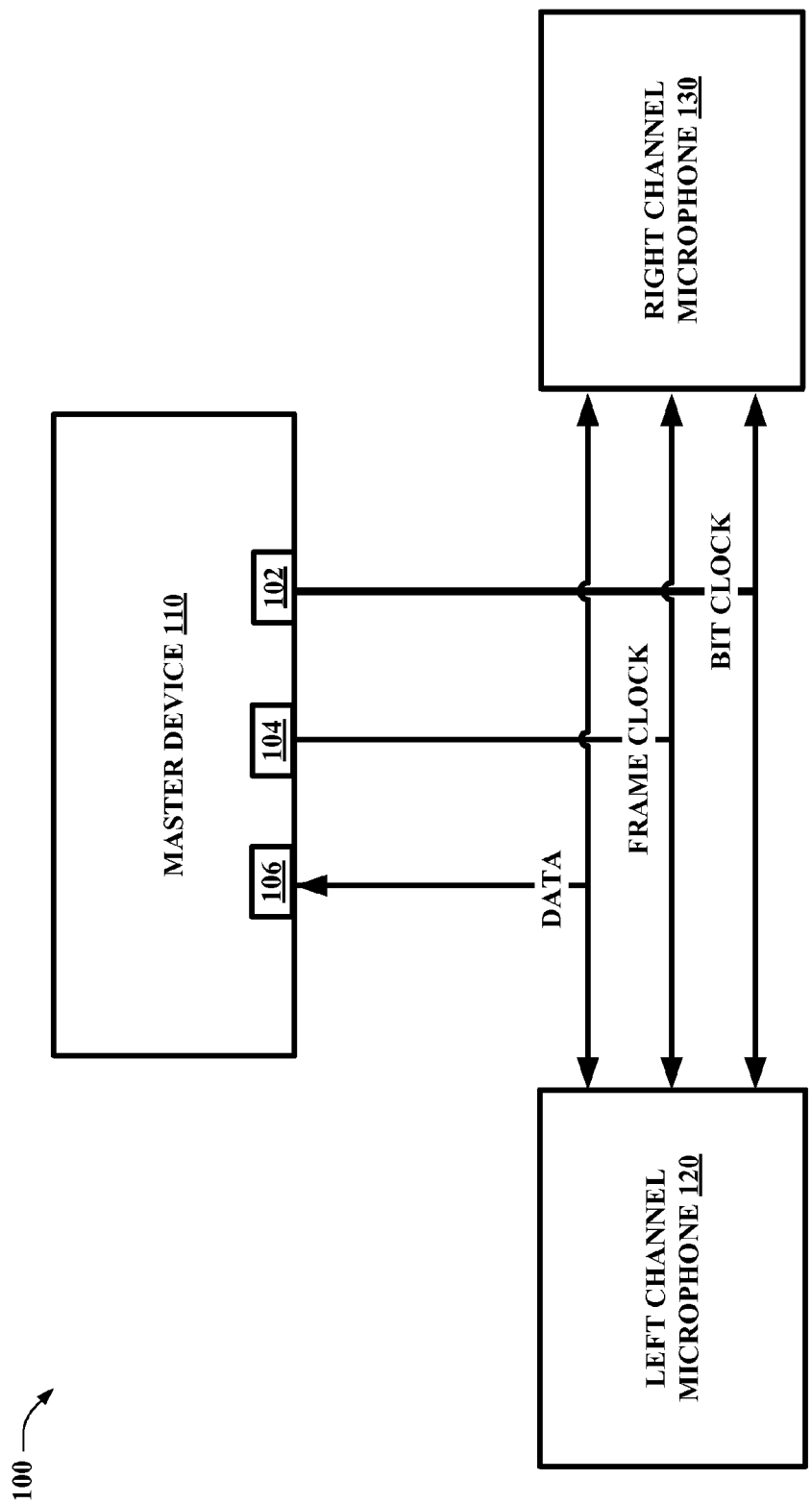
FIG. 1 illustrates a block diagram of an integrated interchip sound ($I^2S$) serial audio stream environment, in accordance with various embodiments.

Aspects of the subject disclosure will now be described more fully hereinafter with reference to the accompanying drawings in which example embodiments are shown. In the following description, for purposes of explanation, numerous specific details are set forth in order to provide a thorough understanding of the various embodiments. However, the subject disclosure may be embodied in many different forms and should not be construed as limited to the example embodiments set forth herein.

Conventional serial audio stream technologies have had some drawbacks with respect to utilizing a unidirectional signal line for data transfer from a microphone to a controlling device. Various embodiments disclosed herein can improve $I^2S$ digital audio applications by utilizing an existing $I^2S$ bus to send control information from a master controlling device to a microphone.

For example, a device, e.g., master device, controller, coder-decoder (codec), microcontroller, etc. can comprise a clock pin, a frame pin, and a data pin. Further, the device can include a clock component, a frame component, and a control component. The clock component can send, via the clock pin, a bit clock signal directed to a slave device, e.g., microphone, micro-electro-mechanical system (MEMS) microphone, etc. The frame component can send, via the frame pin, a frame clock signal directed to the slave device. In this regard, the control component can receive, via the data pin during a first portion of a first phase of a period of the frame clock signal, slave data, e.g., digital audio data, acoustic audio data, an $I^2S$ audio word, etc. from the slave device on a bit-by-bit basis based on the bit clock signal according to an $I^2S$ based protocol. Further, the control component can send, via the data pin during a second portion of the first phase of the period, after the first portion of the first phase, a first part of a set of control bits, e.g., representing control information, configuration information, etc. directed to the slave device on the bit-by-bit basis based on the bit clock signal. In this regard, the device, master device, etc. can send, via an $I^2S$ bus, control information to the slave device, microphone, etc. utilizing an unused portion of an $I^2S$ audio word frame.

In an embodiment, the slave data can comprise digital audio data corresponding to a first channel, e.g., left channel, right channel, etc. of a microphone, MEMS microphone, etc. In another embodiment, the set of control bits can comprise information for configuring the microphone, MEMS microphone, etc. In one embodiment, the period of the frame clock signal can comprise 48 cycles of the bit clock signal, and the first phase of the period can comprise 24 cycles of the bit clock signal. In yet another embodiment, the period of the frame clock signal can comprise 64 cycles of the bit clock signal, and the first phase of the period can comprise 32 cycles of the bit clock signal.

In one embodiment, the control component can send, via the data pin during a first portion of a second phase of the period after the first phase, a second part of the set of control bits directed to the slave device on the bit-by-bit basis based on the bit clock signal. In this regard, the second portion of the first phase of the period can comprise 7 cycles of the bit clock signal, and the first portion of the second phase of the period can comprise 1 cycle of the bit clock signal—the first part of the set of control bits comprising 7 bits of a byte of control data, and the second part of the set of control bits comprising 1 bit of the byte of control data.

In another embodiment, the control component can receive, via the data pin during the first portion of the second phase of the period, e.g., after sending of the second part of the set of control bits directed to the slave device, other slave data (e.g., acoustic audio data, an $I^2S$ audio word, digital audio data corresponding to a second channel, e.g., right channel, left channel, etc. associated with the microphone, MEMS microphone, etc.) from the slave device on the bit-by-bit basis based on the bit clock signal according to the $I^2S$ based protocol.

In yet another embodiment, the control component can send, via the data pin during a second portion of the second phase of the period, after the first portion of the second phase, another set of control bits, e.g., comprising 8 or less bits, directed to the slave device on the bit-by-bit basis based on the bit clock signal. In this regard, the other set of control bits can comprise control information, configuration information, etc., e.g., for configuring the microphone, MEMS microphone, etc.

In one embodiment, the second phase of the period can comprise 24 cycles of the bit clock signal, and the first portion of the second phase of the period can comprise 16 cycles of the bit clock. In another embodiment, the second phase of the period can comprise 32 cycles of the bit clock signal, and the first portion of the second phase of the period can comprise 24 cycles of the bit clock.

In an embodiment, a device, e.g., microphone, MEMS microphone, etc. can comprise a clock pin, a frame pin, and a data pin. Further, the device can include a bit clock component, a phase clock component, and a data component. The bit clock component can receive, via the clock pin, a bit clock signal from a master device, e.g., controller, codec, microcontroller, etc. The phase clock component can receive, via the frame pin, a frame clock signal from the master device. In this regard, the data component can send, via the data pin during a first portion of a first phase of a period of the frame clock signal, slave data, e.g., digital audio data, acoustic audio data, $I^2S$ audio word, etc. directed to the master device on a bit-by-bit basis based on the bit clock signal according to an $I^2S$ based protocol. Further, the data component can receive, via the data pin during a second portion of the first phase of the period, after the first portion of the first phase, a first part of a set of control bits, e.g., representing microphone configuration information, from the master device on the bit-by-bit basis based on the bit clock signal.

In another embodiment, the data component can receive, via the data pin during a first portion of a second phase of the period after the first phase of the period, a second part of the set of control bits, e.g., representing the microphone configuration information, from the master device on the bit-by-bit basis based on the bit clock signal. In yet another embodiment, the second portion of the first phase of the period comprises 7 cycles of the bit clock signal, and the first portion of the second phase of the period comprises 1 cycle of the bit clock signal.

In an embodiment, a method can comprise sending, by a master device, e.g., controller, codec, microcontroller, etc. via a clock pin, a bit clock signal directed to a slave device, e.g., microphone, MEMS microphone, etc.; sending, by the master device via a frame clock pin, a frame clock signal directed to the slave device; receiving, by the master device via a data pin during a first portion of a first phase of a period of the frame clock signal, a first set of slave data, e.g., digital audio data corresponding to an audio channel, acoustic audio data, an $I^2S$ audio word, etc. from the slave device on a bit-by-bit basis based on the bit clock signal and an $I^2S$ based protocol; and sending, by the master device via the data pin during a second portion of the first phase of the period after the first portion of the first phase of the period, first control data, e.g., configuration information, etc. directed to the slave device on the bit-by-bit basis based on the bit clock signal.

In one embodiment, the method can further comprise sending, by the master device via the data pin during a first portion of a second phase of the period after the first phase of the period, second control data, e.g., configuration information, etc. directed to the slave device on the bit-by-bit basis based on the bit clock signal.

In another embodiment, the method can further comprise receiving, by the master device via the data pin during a first portion of a second phase of the period after the first phase of the period, a second set of slave data, e.g., digital audio data corresponding to an audio channel, acoustic audio data, an $I^2S$ audio word, etc. from the slave device on the bit-by-bit basis based on the bit clock signal and the $I^2S$ based protocol.

In yet another embodiment, the method can further comprise sending, by the master device via the data pin during a second portion of the second phase of the period after the first portion of the second phase of the period, second control data, e.g., configuration information, etc. directed to the slave device on the bit-by-bit basis based on the bit clock signal.

In one embodiment, the first phase of the period comprises 24 cycles of the bit clock signal and the first portion of the first phase comprises 16 cycles of the bit clock signal. In another embodiment, the first phase of the period comprises 32 cycles of the bit clock signal and the first portion of the first phase comprises 24 cycles of the bit clock signal.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

Furthermore, to the extent that the terms "includes," "has," "contains," and other similar words are used in either the detailed description or the appended claims, such terms are intended to be inclusive—in a manner similar to the term "comprising" as an open transition word—without precluding any additional or other elements. Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Aspects of apparatus, devices, processes, and process blocks explained herein can constitute machine-executable instructions embodied within a machine, e.g., embodied in a memory device, computer readable medium (or media) associated with the machine. Such instructions, when executed by the machine, can cause the machine to perform the operations described. Additionally, aspects of the apparatus, devices, processes, and process blocks can be embodied within hardware, such as an application specific integrated circuit (ASIC) or the like. Moreover, the order in which some or all of the process blocks appear in each process should not be deemed limiting. Rather, it should be understood by a person of ordinary skill in the art having the benefit of the instant disclosure that some of the process blocks can be executed in a variety of orders not illustrated.

Furthermore, the word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art having the benefit of the instant disclosure.

As described above, conventional serial audio stream technologies have had some drawbacks with respect to utilizing a unidirectional signal line for data transfer from a microphone to a controlling device. On the other hand, various embodiments disclosed herein can improve $I^2S$ digital audio applications by utilizing an existing I²S bus to send control information from a master controlling device to a microphone.

Figure 2:
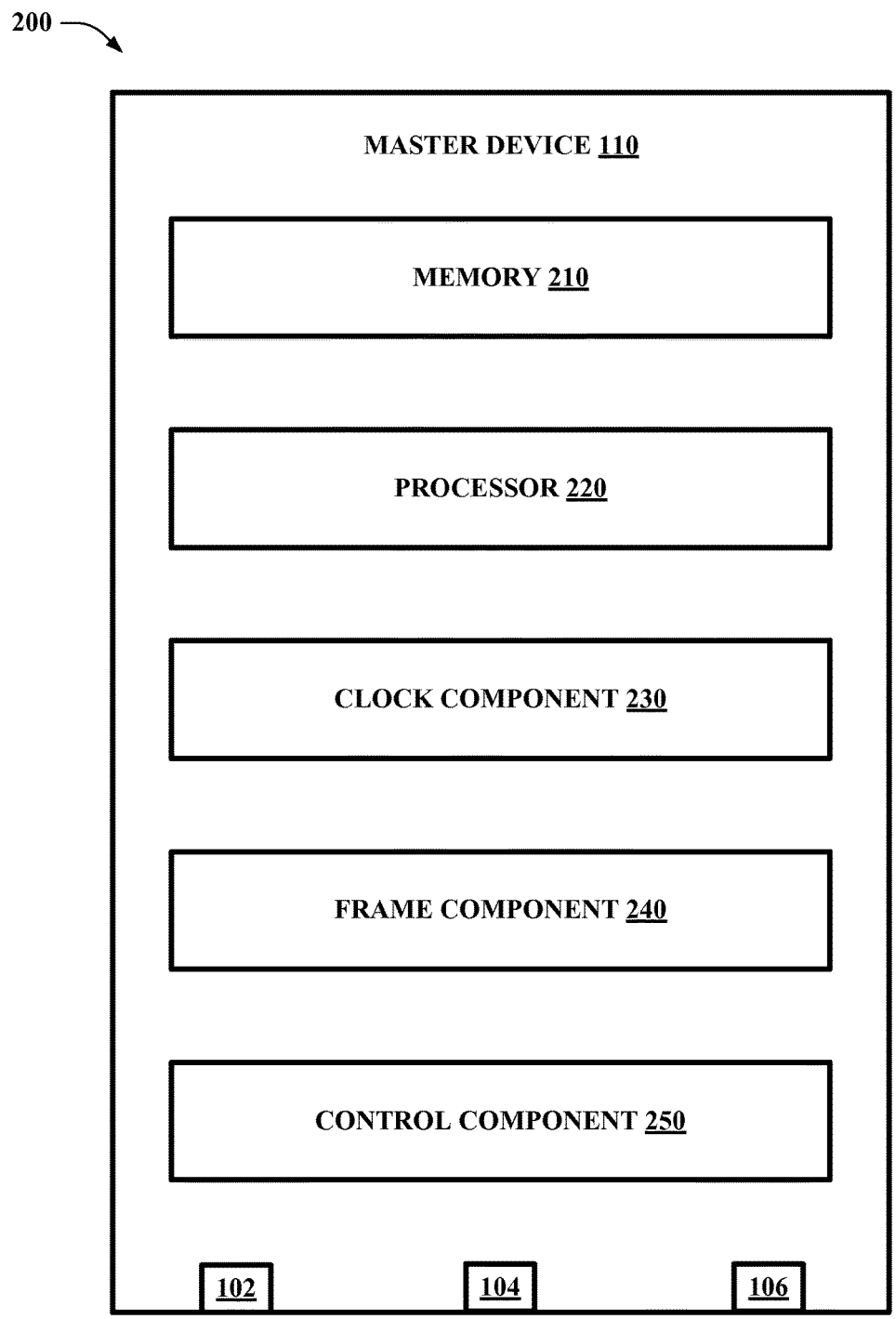
FIG. 2 illustrates a block diagram of a master device in an $I^2S$ serial audio stream environment, in accordance with various embodiments.

In this regard, and now referring to FIGS. 1 and 2, a block diagram of an I²S serial audio stream environment (100), and a block diagram of master device 110 are illustrated, respectively, in accordance with various embodiments. Master device 110, e.g., processor, microprocessor, codec, microcontroller, etc. is communicatively coupled to left channel microphone 120, e.g., MEMS microphone, first slave device, etc. and right channel microphone 130, e.g., MEMS microphone, second slave device, etc. via an I²S data bus comprising a "bit clock" signal coupled to clock pin 102, a "frame clock" signal coupled to frame pin 104, and a "data" signal coupled to data pin 106. Further, master device 110 includes memory 210 and processor 220 for performing operations corresponding to clock component 230, frame component 240, and control component 250.

Clock component 230 can send, via clock pin 102, the bit clock signal to left channel microphone 120 and right channel microphone 130, and frame component 240 can send, via frame pin 104, the frame clock signal directed to left channel microphone 120 and right channel microphone 130. As illustrated by FIGS. 3-6, control component 250 can receive, via data pin 106 during a first portion (e.g., comprising bit clock cycles 2-17) of a first phase (e.g., comprising bit clock cycles 1-24) of a period of the frame clock signal, slave data, e.g., left channel audio, digital audio data, acoustic audio data, an I²S audio word, etc. from left channel microphone 120 on a bit-by-bit basis based on the bit clock signal according to an I²S based protocol.

Further, control component 250 can send, via data pin 106 during a second portion (e.g., comprising bit clock cycles 18-25, comprising bit clock cycles 20-25, comprising bit clock cycles 20-23, comprising bit clock cycles 18-21, etc.) of the first phase of the period, after the first portion of the first phase, a first part of a first set of control bits, e.g., representing control information, configuration information, etc. to left channel microphone 120 on the bit-by-bit basis based on the bit clock signal. In this regard, master device 110 can send, via the I²S bus, control information to left channel microphone 120 utilizing an unused portion of an I²S audio word frame to facilitate configuration of left channel microphone 120.

Figure 3:
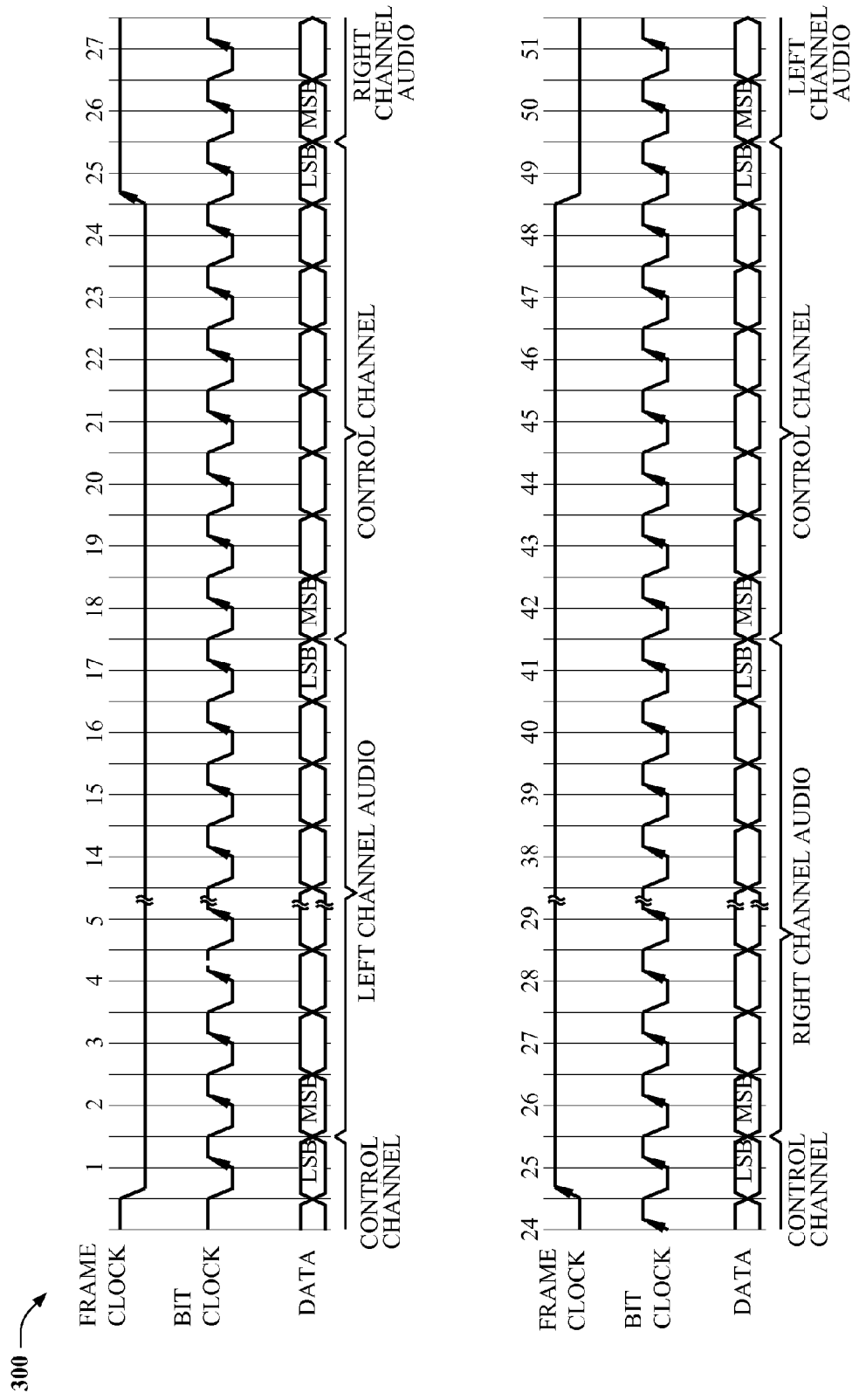
FIGS. 3-6 illustrate waveforms of an $I^2S$ serial audio stream environment corresponding to a 48-bit clock period, in accordance with various embodiments.
Figure 4:
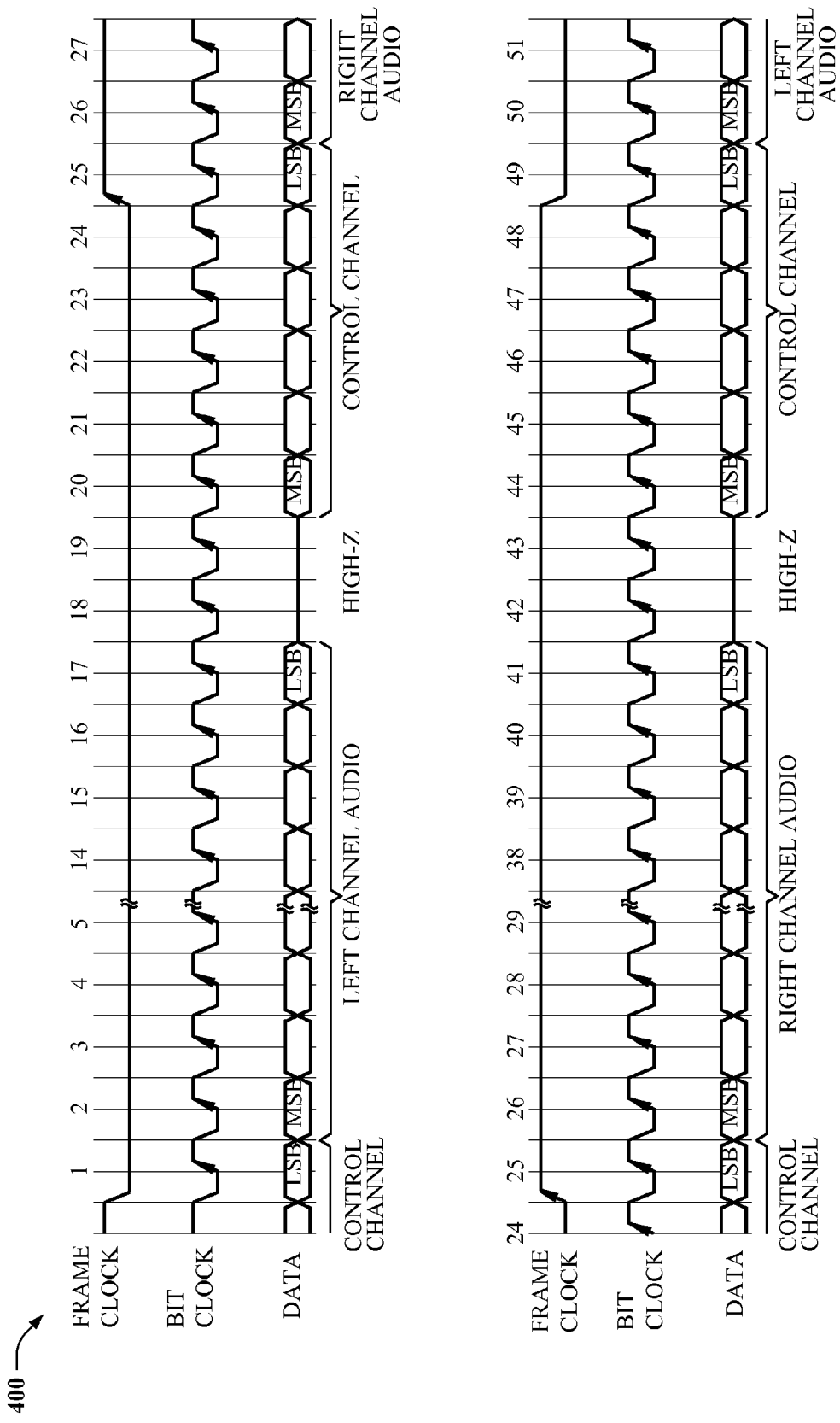
Figure 5:
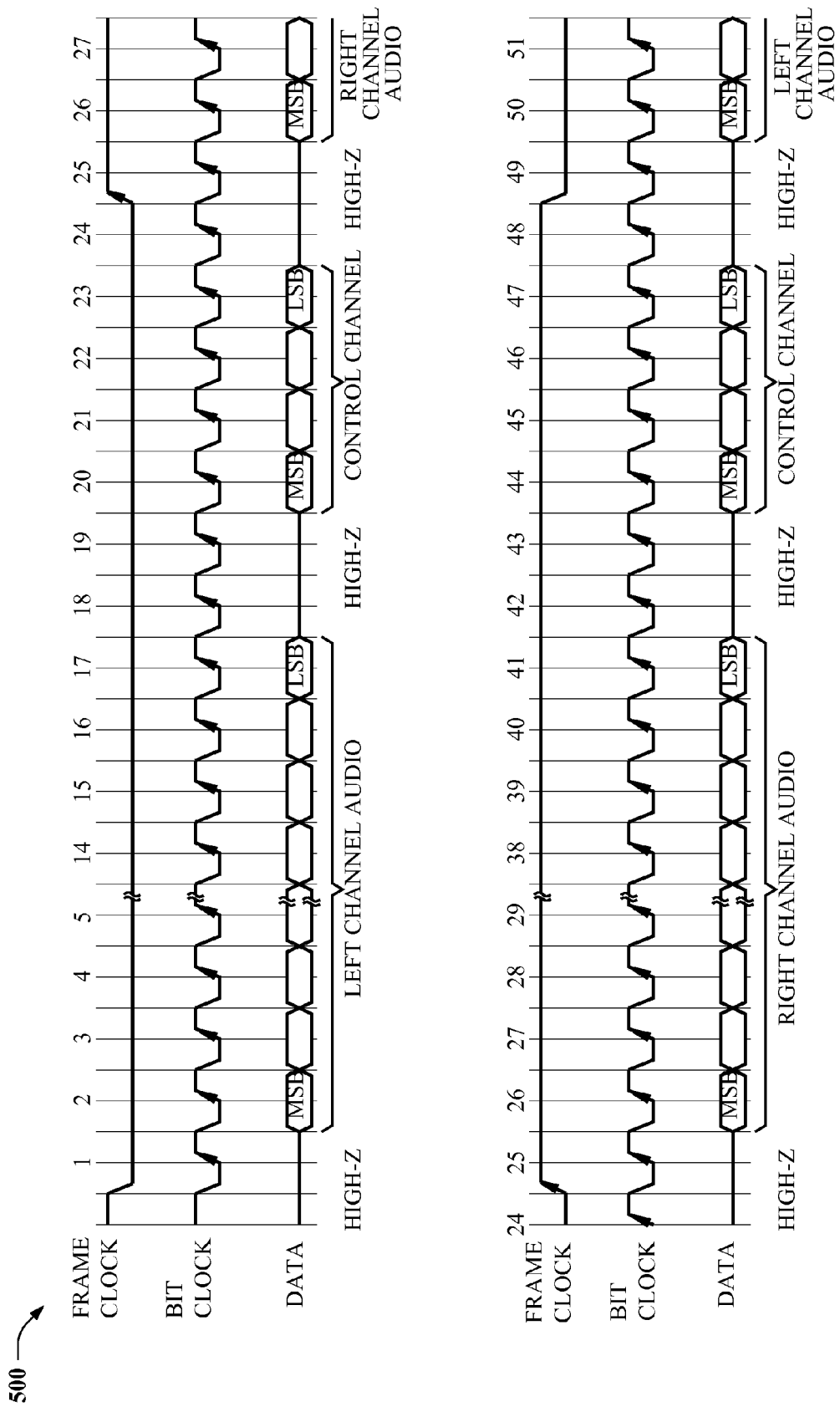
Figure 6:
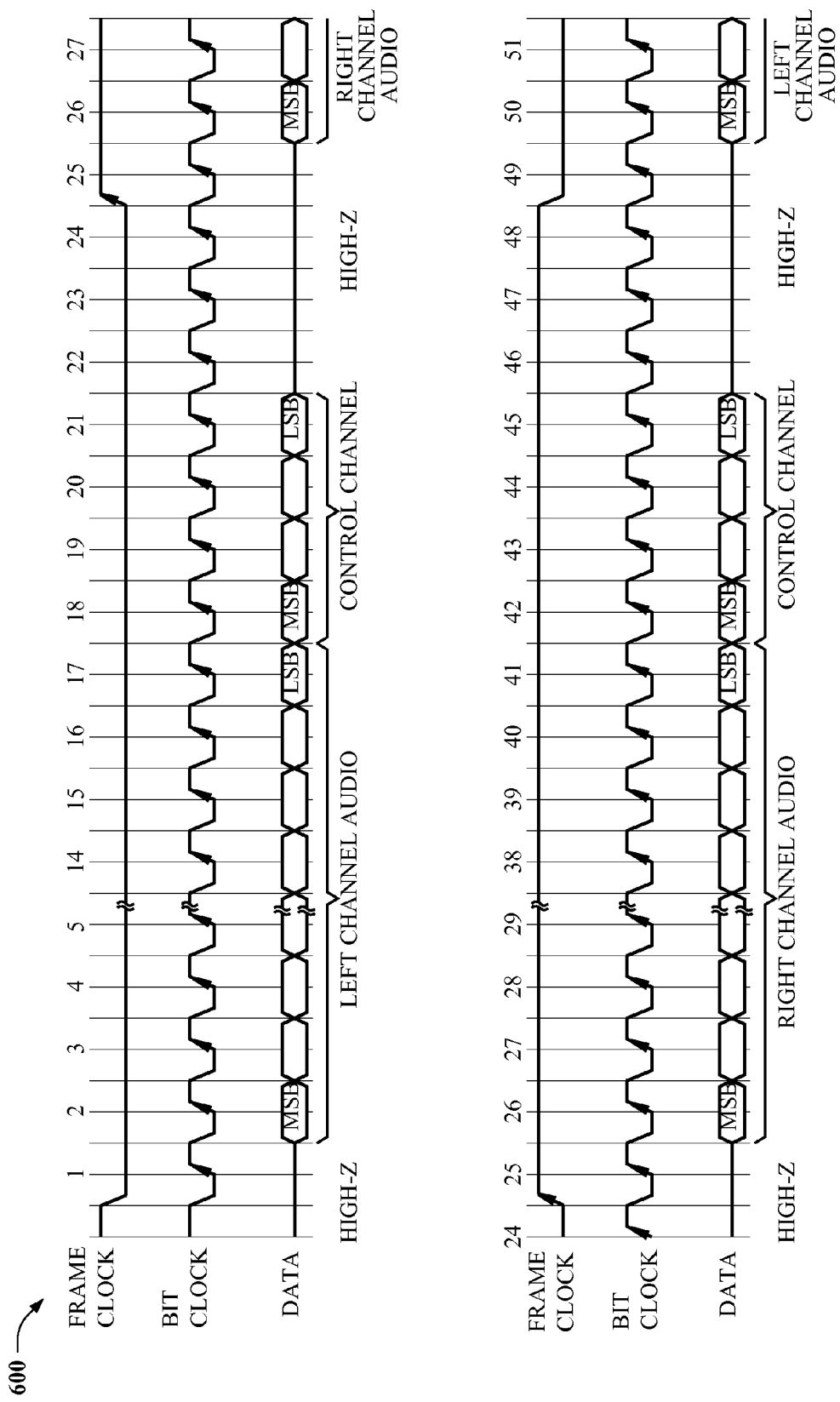

It should be appreciated by a person of ordinary skill in the art of serial audio stream technologies having the benefit of the instant disclosure that the first part of the first set of control bits can comprise 1 to 8 bits of information, and such information can be transferred during previously unused I²S bus bit clock cycles 18-25. For example, as illustrated by FIGS. 3 and 4, control component 250 can send, via data pin 106 during a first portion (e.g., comprising bit clock cycle 25) of a second phase (e.g., comprising bit clock cycles 25-48) of the period, after the first phase of the period, a second part of the first set of control bits to left channel microphone 120 on the bit-by-bit basis based on the bit clock signal. In this regard, the second portion of the first phase of the period comprises 7 cycles of the bit clock signal, and the first portion of the second phase of the period comprises 1 cycle of the bit clock signal.

Control component 250 can further receive, via data pin 106 during the first portion (e.g., comprising bit clock cycles 26-41) of the second phase (e.g., comprising bit clock cycles 25-48) of the period after the first phase, slave data, e.g., right channel audio, digital audio data, acoustic audio data, an I²S audio word, etc. from right channel microphone 130 on the bit-by-bit basis based on the bit clock signal according to the I²S based protocol.

Further, control component 250 can send, via data pin 106 during a second portion (e.g., comprising bit clock cycles 42-49, comprising bit clock cycles 44-49, comprising bit clock cycles 44-47, comprising bit clock cycles 42-45, etc.) of the second phase of the period, after the first portion of the second phase, a second set of control bits, e.g., representing control information, configuration information, etc. to right channel microphone 130 on the bit-by-bit basis based on the bit clock signal. In this regard, master device 110 can send, via the I²S bus, control information to right channel microphone 130 utilizing an unused portion of an I²S audio word frame to facilitate configuration of right channel microphone 130.

It should be appreciated by a person of ordinary skill in the art of serial audio stream technologies having the benefit of the instant disclosure that the second set of control bits can comprise 1 to 8 bits of information, and such information can be transferred during previously unused I²S bus bit clock cycles 42-49. For example, as illustrated by FIGS. 3 and 4, control component 250 can send, via data pin 106 during a first portion (e.g., comprising bit clock cycle 49) of a first phase (e.g., comprising bit clock cycles 49-72) of another period, after the second phase of the period, a part of the second set of control bits to right channel microphone 130 on the bit-by-bit basis based on the bit clock signal. In this regard, the second portion of the second phase of the period comprises 7 cycles of the bit clock signal, and the first portion of the first phase of the other period comprises 1 cycle of the bit clock signal.

Now referring to FIGS. 7-10, control component 250 can receive, via data pin 106 during a first portion (e.g., comprising bit clock cycles 2-25) of a first phase (e.g., comprising bit clock cycles 1-32) of a period of the frame clock signal, slave data, e.g., left channel audio, digital audio data, acoustic audio data, an I²S audio word, etc. from left channel microphone 120 on a bit-by-bit basis based on the bit clock signal according to an I²S based protocol.

Further, control component 250 can send, via data pin 106 during a second portion (e.g., comprising bit clock cycles 26-33, comprising bit clock cycles 30-33, comprising bit clock cycles 27-31, comprising bit clock cycles 26-31, etc.) of the first phase of the period, after the first portion of the first phase, a first part of a first set of control bits, e.g., representing control information, configuration information, etc. to left channel microphone 120 on the bit-by-bit basis based on the bit clock signal. In this regard, master device 110 can send, via the I²S bus, control information to left channel microphone 120 utilizing an unused portion of an I²S audio word frame to facilitate configuration of left channel microphone 120.

Figure 7:
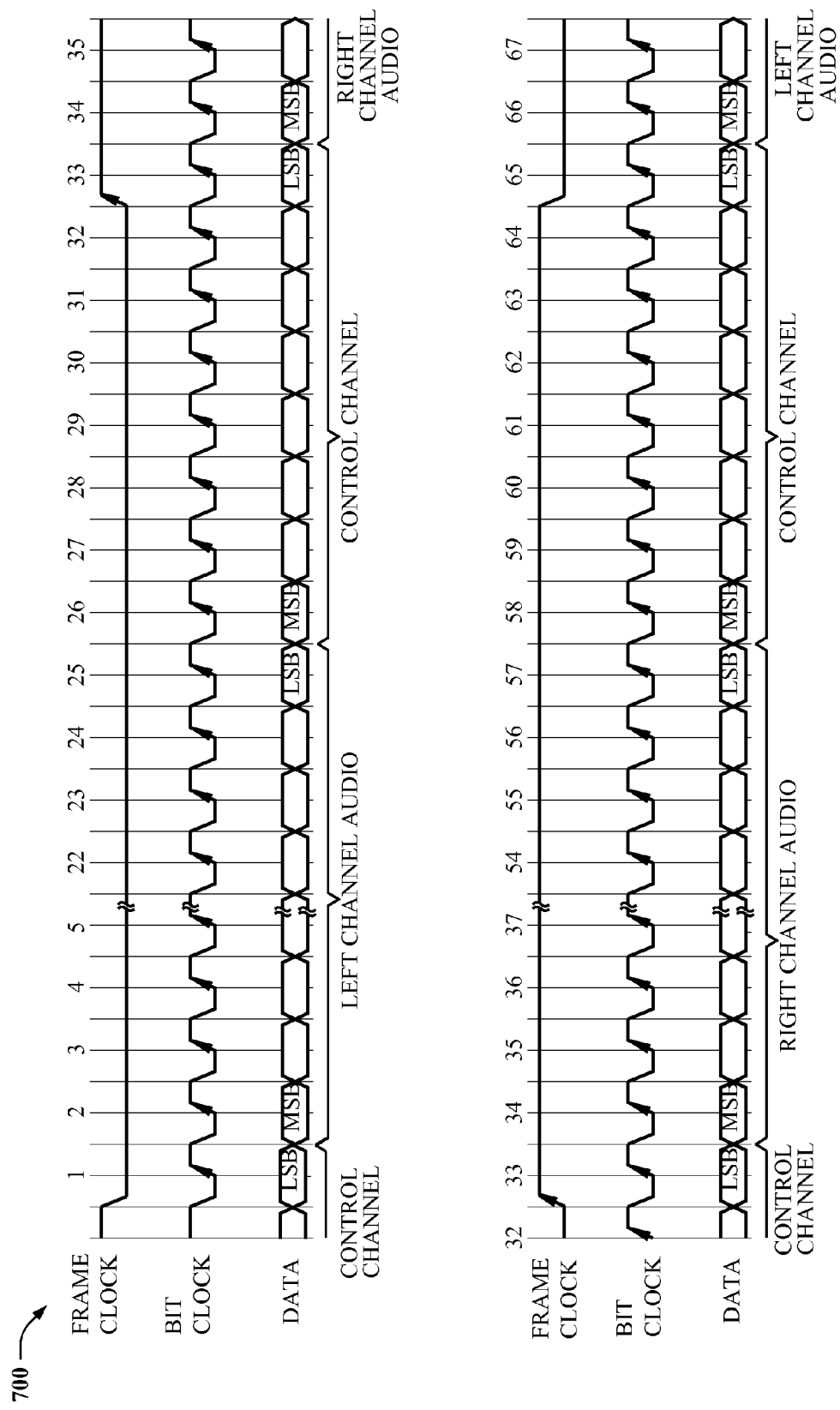
FIGS. 7-10 illustrates waveforms of an $I^2S$ serial audio stream environment corresponding to a 64-bit clock period, in accordance with various embodiments.
Figure 8:
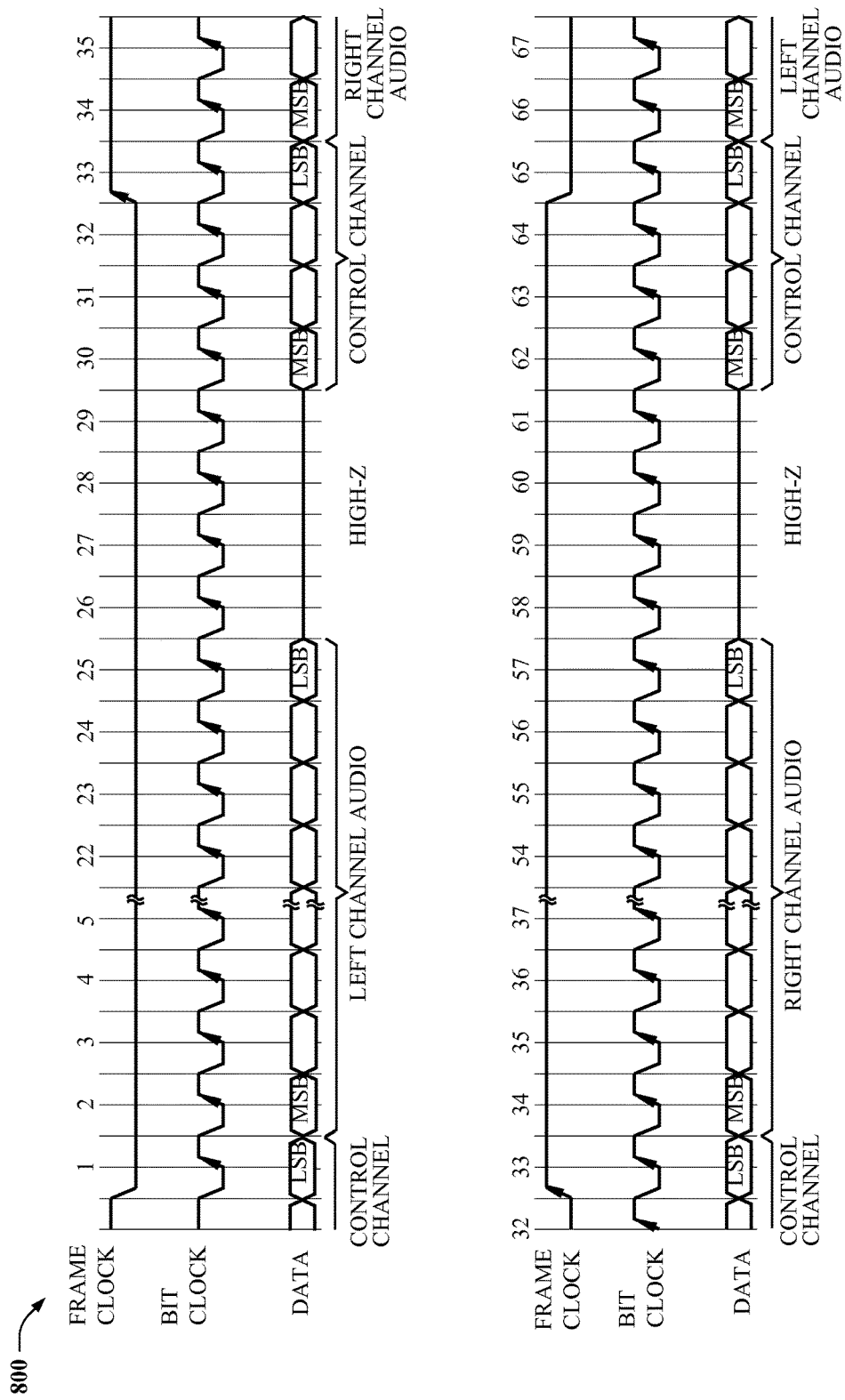
Figure 9:
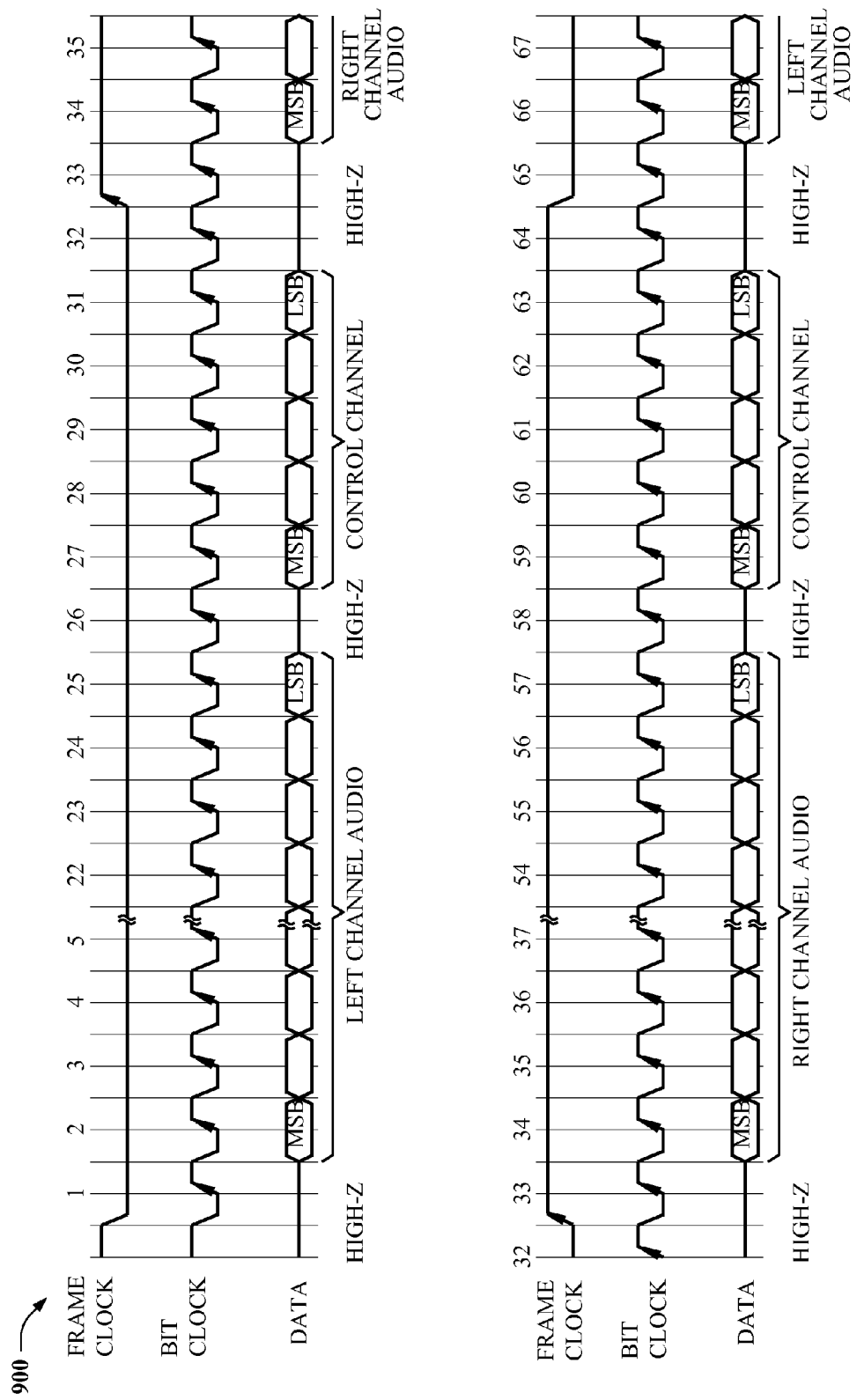
Figure 10:
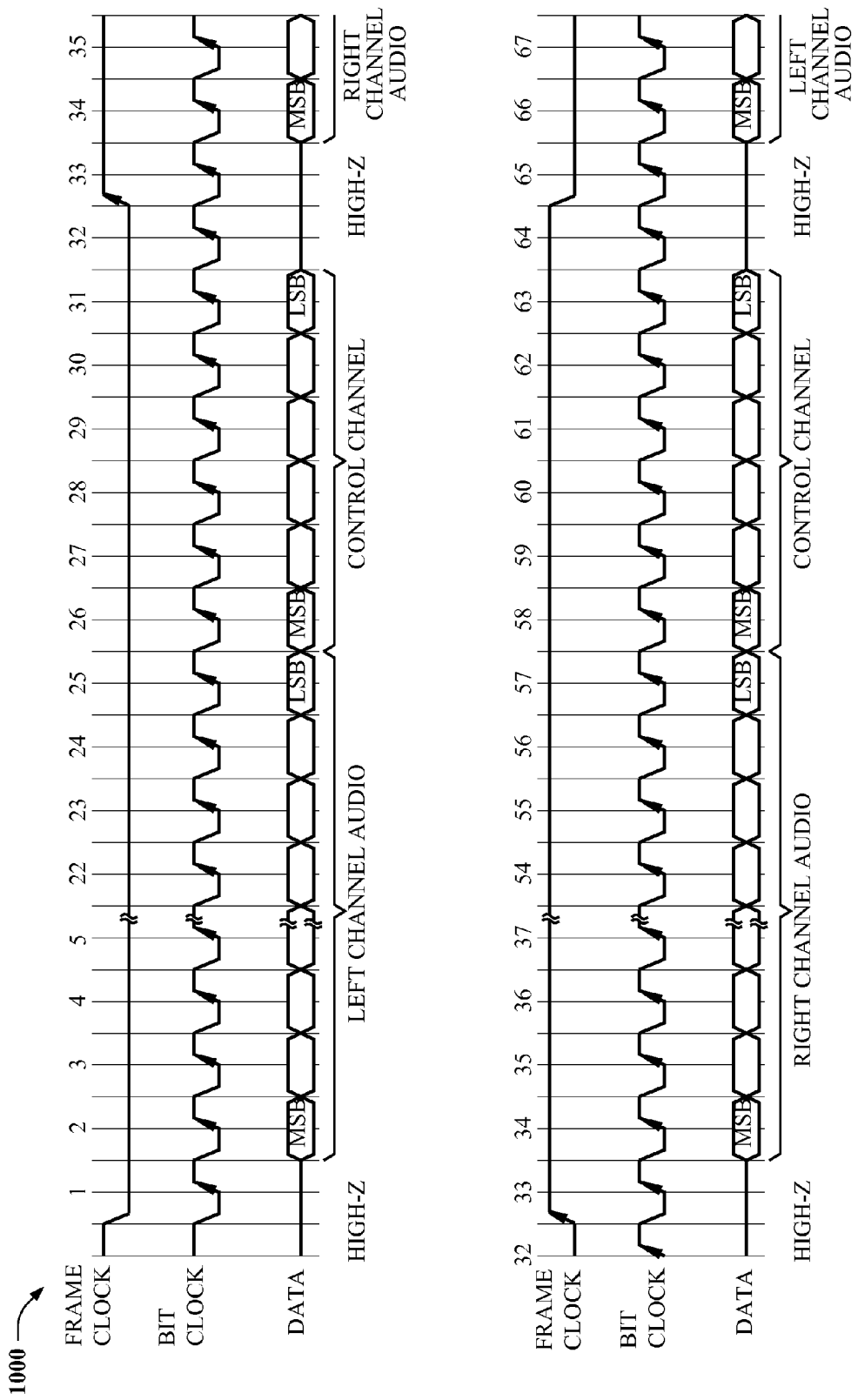

It should be appreciated by a person of ordinary skill in the art of serial audio stream technologies having the benefit of the instant disclosure that the first part of the first set of control bits can comprise 1 to 8 bits of information, and such information can be transferred during previously unused I²S bus bit clock cycles 26-33. For example, as illustrated by FIGS. 7 and 8, control component 250 can send, via data pin 106 during a first portion (e.g., comprising bit clock cycle 33) of a second phase (e.g., comprising bit clock cycles 33-64) of the period, after the first phase of the period, a second part of the first set of control bits to left channel microphone 120 on the bit-by-bit basis based on the bit clock signal. In this regard, the second portion of the first phase of the period comprises 7 cycles of the bit clock signal, and the first portion of the second phase of the period comprises 1 cycle of the bit clock signal.

Control component 250 can further receive, via data pin 106 during the first portion (e.g., comprising bit clock cycles 34-57) of the second phase (e.g., comprising bit clock cycles 33-64) of the period after the first phase, slave data, e.g., right channel audio, digital audio data, acoustic audio data, an $I^2S$ audio word, etc. from right channel microphone 130 on the bit-by-bit basis based on the bit clock signal according to the $I^2S$ based protocol.

Further, control component 250 can send, via data pin 106 during a second portion (e.g., comprising bit clock cycles 58-65, comprising bit clock cycles 62-65, comprising bit clock cycles 59-63, comprising bit clock cycles 58-63, etc.) of the second phase of the period, after the first portion of the second phase, a second set of control bits, e.g., representing control information, configuration information, etc. to right channel microphone 130 on the bit-by-bit basis based on the bit clock signal. In this regard, master device 110 can send, via the $I^2S$ bus, control information to right channel microphone 130 utilizing an unused portion of an $I^2S$ audio word frame to facilitate configuration of right channel microphone 130.

It should be appreciated by a person of ordinary skill in the art of serial audio stream technologies having the benefit of the instant disclosure that the second set of control bits can comprise 1 to 8 bits of information, and such information can be transferred during previously unused $I^2S$ bus bit clock cycles 58-65. For example, as illustrated by FIGS. 7 and 8, control component 250 can send, via data pin 106 during a first portion (e.g., comprising bit clock cycle 65) of a first phase (e.g., comprising bit clock cycles 65-96) of another period, after the second phase of the period, a part of the second set of control bits to right channel microphone 130 on the bit-by-bit basis based on the bit clock signal. In this regard, the second portion of the second phase of the period comprises 7 cycles of the bit clock signal, and the first portion of the first phase of the other period comprises 1 cycle of the bit clock signal.

Figure 11:
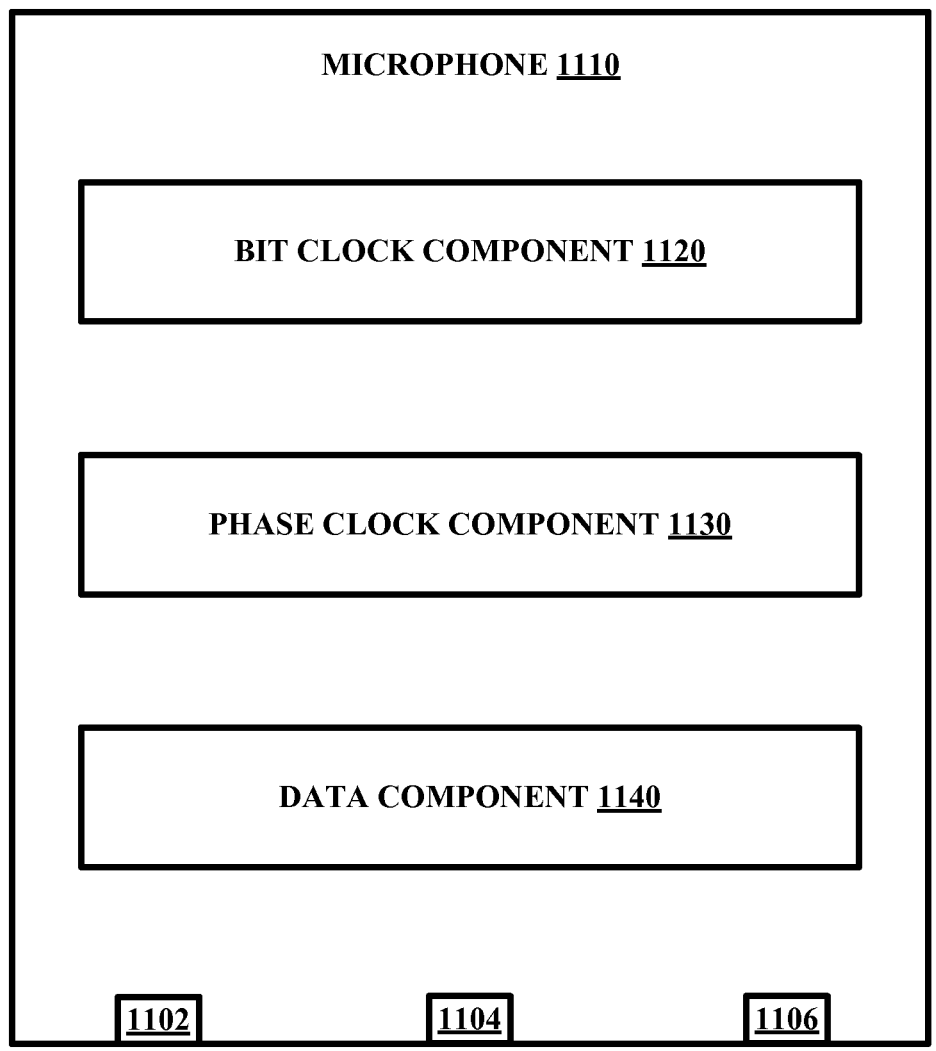
FIG. 11 illustrates a block diagram of a microphone, in accordance with various embodiments.

FIG. 11 illustrates a block diagram of a microphone (1110), e.g., MEMS microphone, in accordance with various embodiments. Microphone 1110 includes clock pin 1102, frame pin 1104, and data pin 1106. In this regard, bit clock component 1120 can receive, via clock pin 1102, a bit clock signal from a master device, e.g., master device 110; and phase clock component 1130 can receive, via frame pin 1104, a frame clock signal from the master device.

Data component 1140 can send, via data pin 1106 during a first portion (e.g., comprising bit clock cycles 2-17, comprising bit clock cycles 2-25) of a first phase of a period of the frame clock signal, slave data, e.g., digital audio data corresponding to an audio channel of microphone 1110, directed to the master device on a bit-by-bit basis based on the bit clock signal according to the $I^2S$ based protocol. Further, data component 1140 can receive, via data pin 1106 during a second portion (e.g., comprising bit clock cycles 18-25, comprising bit clock cycles 20-25, comprising bit clock cycles 20-23, comprising bit clock cycles 18-21, comprising bit clock cycles 26-33, comprising bit clock cycles 30-33, comprising bit clock cycles 27-31, comprising bit clock cycles 26-31, etc.) of the first phase of the period after the first portion of the first phase of the period, a first part of a set of control bits from the master device on the bit-by-bit basis based on the bit clock signal. It should be appreciated by a person of ordinary skill in the art of serial audio stream technologies having the benefit of the instant disclosure that the first part of the set of control bits can comprise 1 to 8 bits of information, and such information can be received by microphone 1110 during previously unused $I^2S$ bus bit clock cycles, e.g., 18-25, 42-49, 26-33, 58-56, etc.

In one embodiment, data component 1140 can receive, via data pin 1106 during a first portion of a second phase of the period after the first phase of the period, a second part of the set of control bits from the master device on the bit-by-bit basis based on the bit clock signal. In this regard, the second portion of the first phase of the period comprises 7 cycles of the bit clock signal, and the first portion of the second phase of the period comprises 1 cycle of the bit clock signal.

Figure 12:
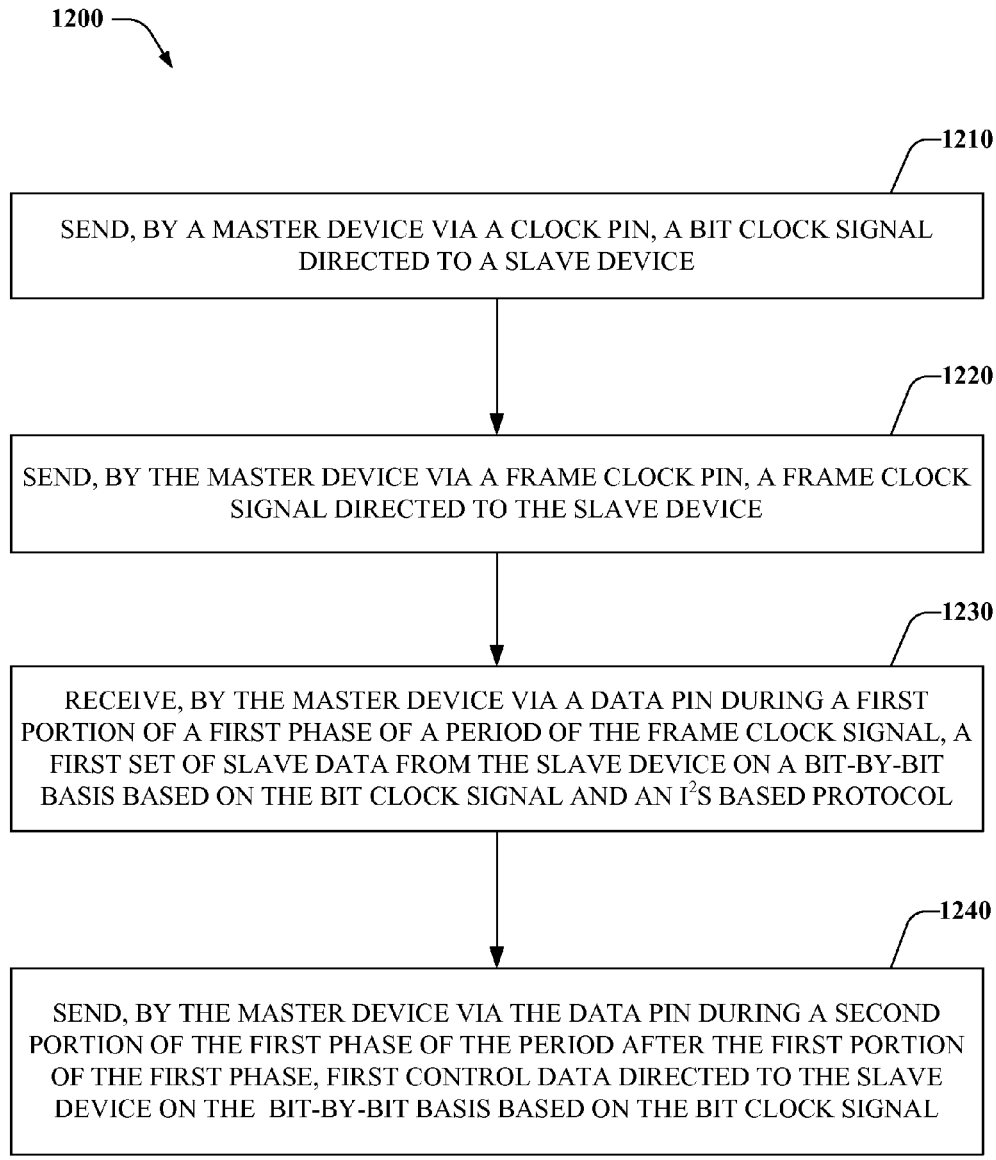
FIGS. 12-13 illustrate flowcharts of methods associated with a master device in an $I^2S$ serial audio stream environment, in accordance with various embodiments.
Figure 13:
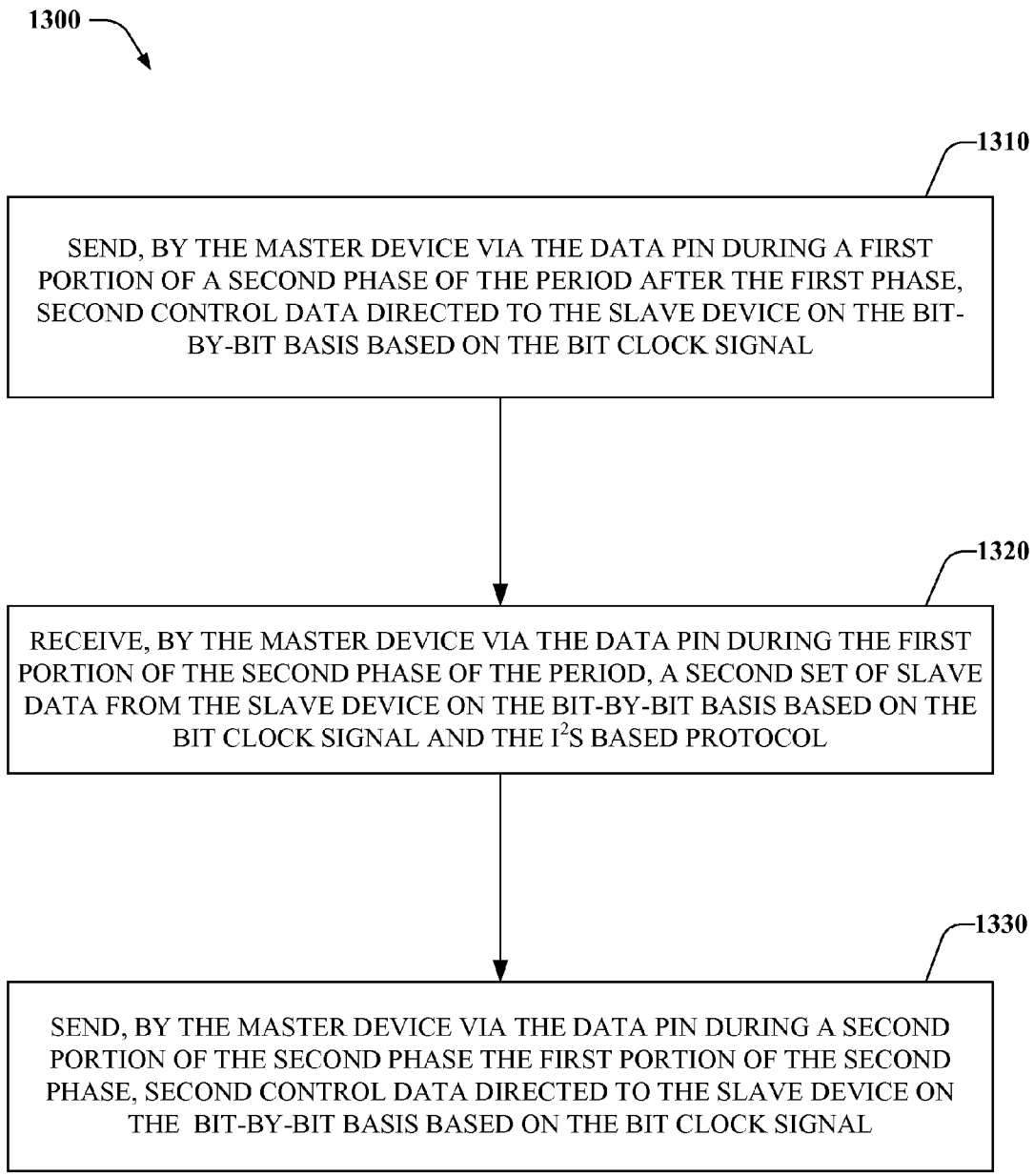
Figure 14:
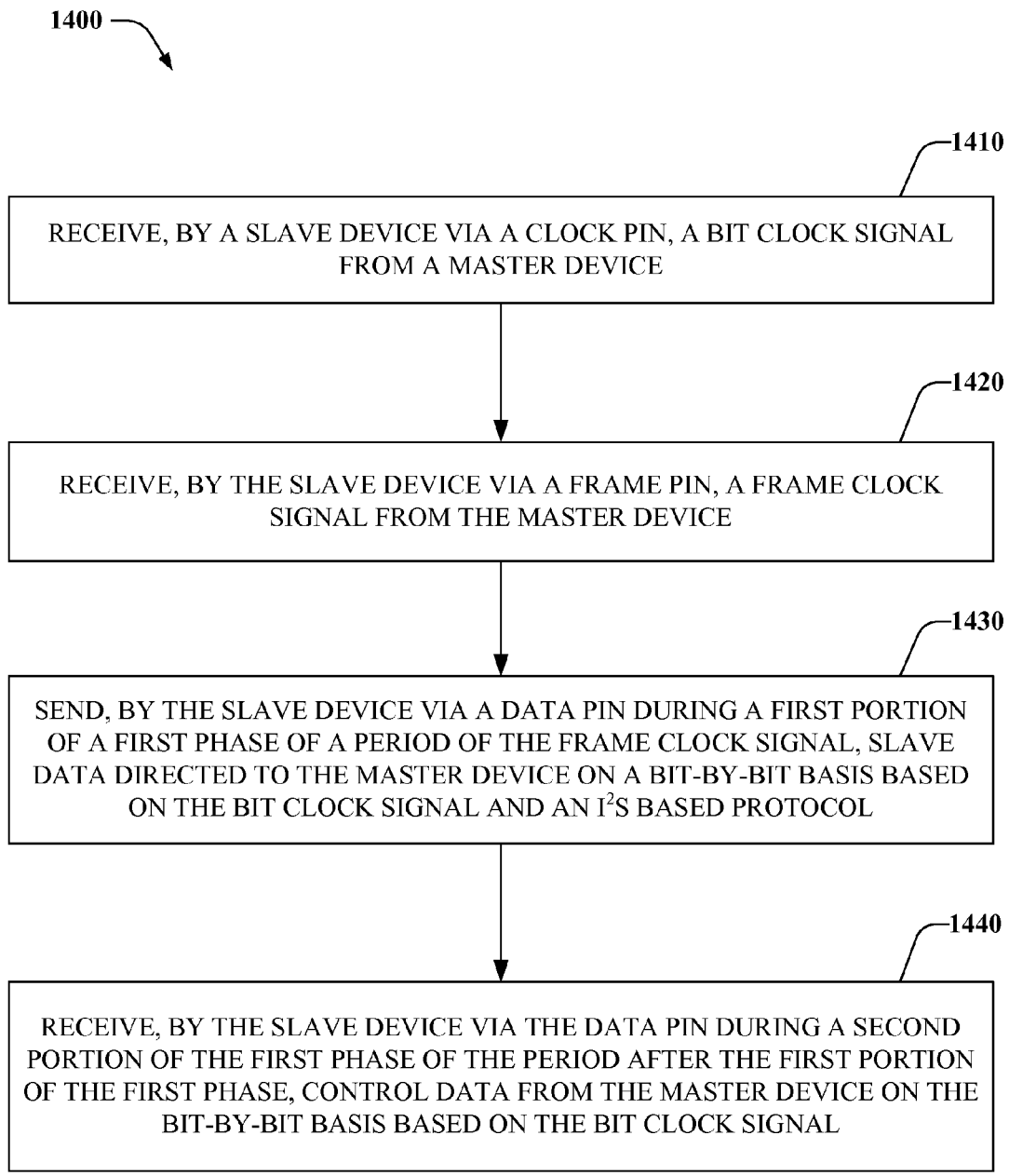
FIG. 14 illustrates a flowchart of a method associated with a microphone in an $I^2S$ serial audio stream environment, in accordance with various embodiments.

FIGS. 12-14 illustrate methodologies in accordance with the disclosed subject matter. For simplicity of explanation, the methodologies are depicted and described as a series of acts. It is to be understood and appreciated that various embodiments disclosed herein are not limited by the acts illustrated and/or by the order of acts. For example, acts can occur in various orders and/or concurrently, and with other acts not presented or described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that methodologies disclosed hereinafter and throughout this specification are capable of being stored on an article of manufacture to facilitate transporting and transferring such methodologies to computers, processors, processing components, etc. The term article of manufacture, as used herein, is intended to encompass a computer program accessible from any computer-readable device, carrier, or media.

Referring now to FIGS. 12-13, processes 1200 and 1300 performed by a device, e.g., master device 110, e.g., processor, microprocessor, codec, microcontroller, etc. are illustrated, in accordance with various embodiments. At 1210, the device can send, via clock pin, a bit clock signal directed to a slave device, e.g., left channel microphone 120, right channel microphone 130, microphone 1110, etc. At 1220, the device can send, via a frame clock pin, a frame clock signal directed to the slave device, e.g., left channel microphone 120, right channel microphone 130, microphone 1110, etc. At 1230, the device can receive, via a data pin during a first portion of a first phase of a period of the frame clock signal, a first set of slave data from the slave device, e.g., left channel microphone 120, on a bit-by-bit basis based on the bit clock signal and an $I^2S$ based protocol. At 1240, the device can send, via the data pin during a second portion of the first phase of the period after the first portion of the first phase, first control data directed to the slave device, e.g., left channel microphone 120, on the bit-by-bit basis based on the bit clock signal.

Referring now to FIG. 13, at 1310, the device can send, via the data pin during a first portion of a second phase of the period after the first phase of the period, second control data directed to the slave device, e.g., left channel microphone 120, on the bit-by-bit basis based on the bit clock signal. At 1320, the device can receive, via the data pin during the first portion of the second phase of the period after the first phase of the period, a second set of slave data from the slave device, e.g., right channel microphone 130, on the bit-by-bit basis based on the bit clock signal and the $I^2S$ based protocol. At 1330, the device can send, via the data pin during a second portion of the second phase of the period after the first portion of the second phase of the period, second control data directed to the slave device, e.g., right channel microphone 130, on the bit-by-bit basis based on the bit clock signal. In one embodiment, the first phase of the period comprises 24 cycles of the bit clock signal and the first portion of the first phase comprises 16 cycles of the bit clock signal. In another embodiment, the first phase of the period comprises 32 cycles of the bit clock signal and the first portion of the first phase comprises 24 cycles of the bit clock signal.

FIG. 14 illustrates a process (1400) performed by a slave device, e.g., left channel microphone 120, right channel microphone 130, microphone 1110, etc., in accordance with various embodiments. At 1410, the slave device can receive, via a clock pin, a bit clock signal from a master device, e.g., master device 110. At 1420, the slave device can receive, via a frame pin, a frame clock signal from the master device. At 1430, the slave device can send, via a data pin during a first portion of a first phase of a period of the frame clock signal, slave data, e.g., digital audio data, directed to the master device on a bit-by-bit basis based on the bit clock signal according to the I$^2$S based protocol. At 1440, the slave device can receive, via the data pin during a second portion of the first phase of the period after the first portion of the first phase of the period, control data from the master device on the bit-by-bit basis based on the bit clock signal.

As it employed in the subject specification, the terms "processor", "processing component", etc. can refer to substantially any computing processing unit or device, e.g., processor 220, etc. comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. Further, a processor can exploit nano-scale architectures such as, but not limited to, molecular and quantum-dot based transistors, switches and gates, e.g., in order to optimize space usage or enhance performance of mobile devices. A processor can also be implemented as a combination of computing processing units, devices, etc.

In the subject specification, terms such as "memory" and substantially any other information storage component relevant to operation and functionality of systems and/or devices disclosed herein, e.g., memory 210, refer to "memory components," or entities embodied in a "memory," or components comprising the memory. It will be appreciated that the memory can include volatile memory and/or nonvolatile memory. By way of illustration, and not limitation, volatile memory, can include random access memory (RAM), which can act as external cache memory. By way of illustration and not limitation, RAM can include synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and/or Rambus dynamic RAM (RDRAM). In other embodiment(s) nonvolatile memory can include read only memory (ROM), programmable ROM (PROM), electrically programmable ROM (EPROM), electrically erasable ROM (EEPROM), or flash memory. Additionally, the MEMS microphones and/or devices disclosed herein can comprise, without being limited to comprising, these and any other suitable types of memory.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A device, comprising:
   a clock pin;
   a frame pin;
   a data pin;
   a clock component configured to send, via the clock pin, a bit clock signal directed to a slave device;
   a frame component configured to send, via the frame pin, a frame clock signal directed to the slave device; and
   a control component configured to
      receive, from the slave device during a first portion of a first phase of a period of the frame clock signal that has been set to a defined logic level during an integrated interchip sound (I$^2$S) audio word frame, first slave data on the data pin on a bit-by-bit basis based on the bit clock signal according to an I$^2$S based protocol, and
      send, during a second portion of the first phase of the period of the frame clock signal that has been set to the defined logic level during a previously unused portion of the I$^2$S audio word frame, after the first portion of the first phase, a first part of a first set of control bits on the data pin directed to the slave device to facilitate a bi-directional use of the data pin while the frame clock signal has been set to the defined logic level during the previously unused portion of the I$^2$S audio word frame, wherein the first part is directed to the slave device on the bit-by-bit basis based on the bit clock signal.

2. The device of claim 1, wherein the slave device comprises a microphone or a micro-electro-mechanical system (MEMS) microphone.

3. The device of claim 2, wherein the first slave data comprises digital audio data corresponding to a first channel of the microphone or the MEMS microphone.

4. The device of claim 2, wherein the first set of control bits comprises information representing a configuration of the microphone or the MEMS microphone.

5. The device of claim 1, wherein the first phase of the period comprises 24 cycles of the bit clock signal or 32 cycles of the bit clock signal.

6. The device of claim 1, wherein the first portion of the first phase of the period comprises 16 cycles of the bit clock signal or 24 cycles of the bit clock signal.

7. The device of claim 1, wherein the control component is further configured to:
send, during a first portion of a second phase of the period after the first phase of the period, a second part of the first set of control bits on the data pin, wherein the second part is directed to the slave device on the bit-by-bit basis based on the bit clock signal.

8. The device of claim 7, wherein the second portion of the first phase of the period comprises 7 cycles of the bit clock signal, and wherein the first portion of the second phase of the period comprises 1 cycle of the bit clock signal.

9. The device of claim 1, wherein the control component is further configured to:
receive, from the slave device during a first portion of a second phase of the period after the first phase of the period, second slave data on the data pin on the bit-by-bit basis based on the bit clock signal according to the I$^2$S based protocol.

10. The device of claim 9, wherein the control component is further configured to:
send, during a second portion of the second phase of the period after the first portion of the second phase of the period, a second set of control bits on the data pin, wherein the second part is directed to the slave device on the bit-by-bit basis based on the bit clock signal.

11. The device of claim 10, wherein the second phase of the period comprises 24 cycles of the bit clock signal or 32 cycles of the bit clock signal.

12. The device of claim 10, wherein the first portion of the second phase of the period comprises 16 or 24 cycles of the bit clock signal.

13. A device, comprising:
a clock pin;
a frame pin;
a data pin;
a bit clock component configured to receive, via the clock pin, a bit clock signal from a master device;
a phase clock component configured to receive, via the frame pin, a frame clock signal from the master device; and
a data component configured to
send, via the data pin during a first portion of a first phase of a period of the frame clock signal that has been set to a defined logic level during an integrated interchip sound (I$^2$S) audio word frame, slave data directed to the master device on a bit-by-bit basis based on the bit clock signal according to an I$^2$S based protocol, and
receive, via the data pin during a second portion of the first phase of the period of the frame clock signal that has been set to the defined logic level during a previously unused portion of the I$^2$S audio word frame, after the first portion of the first phase of the period, a first part of a set of control bits from the master device on the bit-by-bit basis based on the bit clock signal to facilitate a bi-directional use of the data pin during the previously unused portion of the I$^2$S audio word frame.

14. The device of claim 13, wherein the data component is further configured to:
receive, via the data pin during a first portion of a second phase of the period after the first phase of the period, a second part of the set of control bits from the master device on the bit-by-bit basis based on the bit clock signal.

15. The device of claim 14, wherein the second portion of the first phase of the period comprises 7 cycles of the bit clock signal, and wherein the first portion of the second phase of the period comprises 1 cycle of the bit clock signal.

16. The device of claim 13, wherein the device comprises a microphone or a micro-electro-mechanical system (MEMS) microphone.

17. The device of claim 16, wherein the slave data comprises digital audio data corresponding to an audio channel of the MEMS microphone.

18. A method, comprising:
sending, by a master device via a clock pin, a bit clock signal directed to a slave device;
sending, by the master device via a frame clock pin, a frame clock signal directed to the slave device;
receiving, by the master device via a data pin during a first portion of a first phase of a period of the frame clock signal that has been set to a defined logic level during an integrated interchip sound (I$^2$S) audio word frame, a first set of slave data from the slave device on a bit-by-bit basis based on the bit clock signal and an I$^2$S based protocol; and
sending, by the master device via the data pin during a second portion of the first phase of the period of the frame clock signal that has been set to the defined logic level during a previously unused portion of the I$^2$S audio word frame, after the first portion of the first phase of the period, first control data directed to the slave device on the bit-by-bit basis based on the bit clock signal.

19. The method of claim 18, further comprising:
sending, by the master device via the data pin during a first portion of a second phase of the period after the first phase of the period, second control data directed to the slave device on the bit-by-bit basis based on the bit clock signal.

20. The method of claim 18, further comprising:
receiving, by the master device via the data pin during a first portion of a second phase of the period after the first phase of the period, a second set of slave data from the slave device on the bit-by-bit basis based on the bit clock signal and the FS based protocol.

21. The method of claim 20, further comprising:
sending, by the master device via the data pin during a second portion of the second phase of the period after the first portion of the second phase of the period, second control data directed to the slave device on the bit-by-bit basis based on the bit clock signal.

22. The method of claim 18, wherein the first phase of the period comprises 24 cycles of the bit clock signal and the first portion of the first phase comprises 16 cycles of the bit clock signal, or the first phase of the period comprises 32 cycles of the bit clock signal and the first portion of the first phase comprises 24 cycles of the bit clock signal.

23. The method of claim 18, wherein the slave device comprises a microphone or a micro-electro-mechanical system (MEMS) microphone.

24. The method of claim 23, wherein the receiving comprises receiving, by the master device via the data pin during the first portion of the first phase of the period, digital audio data corresponding to a first channel of the microphone or the MEMS microphone.

\* \* \* \* \*